May 7, 1946. W. W. BAUCUM 2,399,904
DEVICE FOR LOADING REVOLVER CHAMBERS SIMULTANEOUSLY
Filed March 25, 1943 2 Sheets-Sheet 2
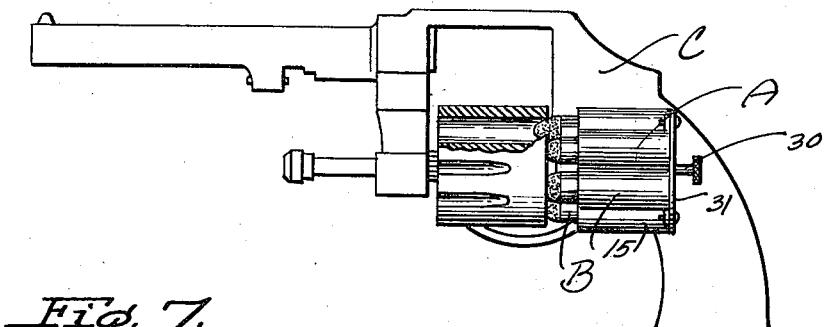
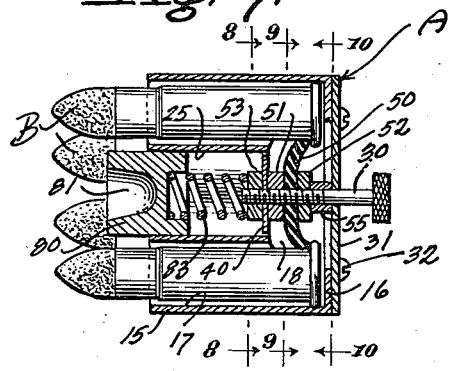
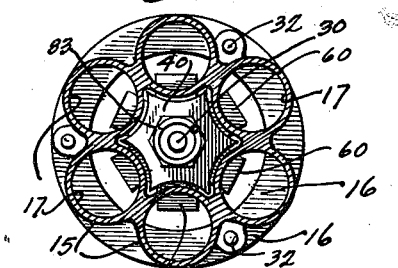
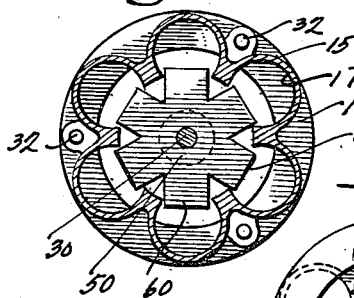
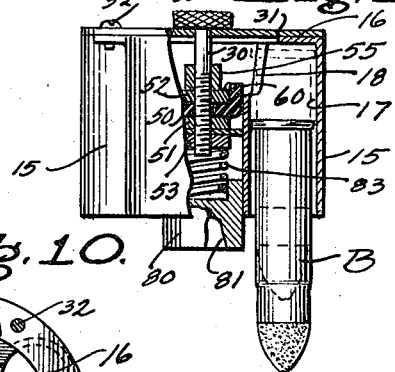
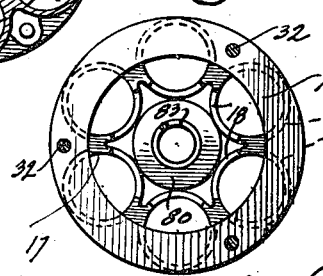
Inventor
W. W. Baucum.

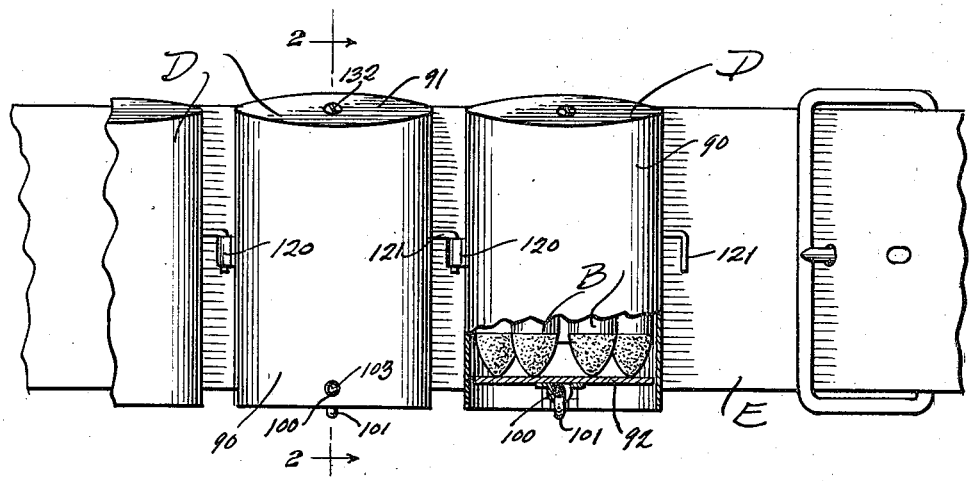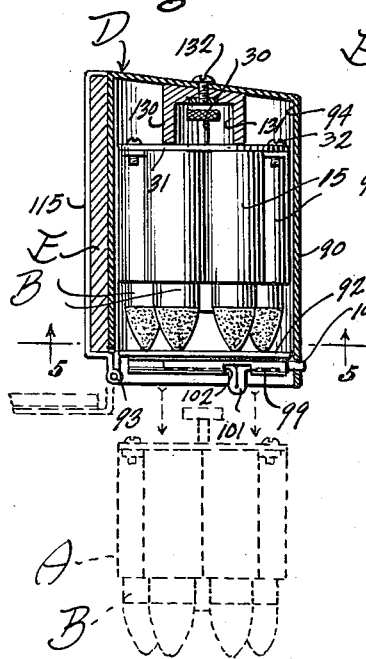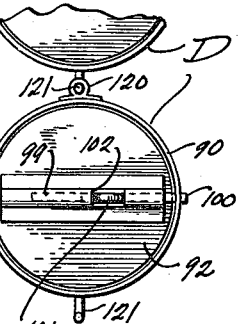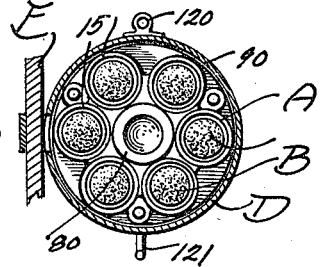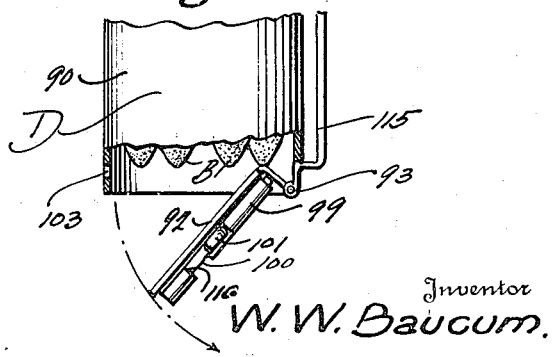

Patented May 7, 1946

2,399,904

UNITED STATES PATENT OFFICE 2,399,904

DEVICE FOR LOADING REVOLVER
CHAMBERS SIMULTANEOUSLY

William W. Baucum, Laurel, Miss., assignor of
one-half to Sidney S. Anderson, Hattiesburg,
Miss.

Application March 25, 1943, Serial No. 480,526

5 Claims. (Cl. 42—89)

This invention relates to improvements in means for simultaneously loading all of the chambers of firearms such as revolvers.

A further object of this invention is the provision of an improved clip which will facilitate the simultaneous loading of all of the chambers of a revolver.

A further object of this invention is the provision of improved holding means for revolver loading cartridge clips.

Other objects and advantages of this invention will be apparent during the course of the following detailed description.

In the accompanying drawings, forming a part of this specification, and wherein similar reference characters designate corresponding parts thruout the several views:

Figure 1 is a fragmentary view of a belt and its holder means for supporting cartridge clips.

Figure 2 is a cross sectional view taken thru a holder and its cartridge clip, showing the means of supporting the holder upon the belt; the view being taken substantially on the line 2—2 of Figure 1.

Figure 3 is a view showing the manner of assemblage of the holders upon a belt.

Figure 4 is a view showing the trap door arrangement of the holder for the purpose of releasing the cartridge clip.

Figure 5 is a cross sectional view taken substantially on the line 5—5 of Figure 2.

Figure 6 is a view showing the means of loading a revolver barrel.

Figure 7 is a cross sectional view taken thru the improved cartridge clip, showing associated features thereof.

Figures 8, 9 and 10 are cross sectional views taken substantially on their respective lines shown in Figure 7 of the drawings.

Figure 11 is a view similar to Figure 7, but with the operating plunger of the cartridge clip depressed for the purpose of releasing the cartridges contained therein.

In the drawings, wherein for the purpose of illustration is shown only a preferred embodiment of the invention, the letter A generally designates the improved cartridge clip adapted to support a plurality of cartridges B in an improved relation so that they can simultaneously be loaded into the chambers of the barrel of a gun, such as a revolver C. In order to compactly and conveniently support the cartridge clips so that they can be instantaneously released by the operator, an improved holder D is provided for support upon a cartridge belt E in an improved manner.

The cartridge clip A preferably comprises a casing having a plurality of integrally connected cartridge receiving cylinders 15 which are arranged in cylindrical arrangement according to the gauge of the particular gun with which the cartridges are to be associated. These cylindrical cartridge chambers 15 are preferably integrally connected longitudinally to each other in the form mentioned and at their ends they are connected together by means of an annular flange 16 which extends inwardly over only part of the chamber 17 of each cartridge cylinder. The inner wall thicknesses of these cartridge cylinders 15 are removed adjacent the flange 16, that is, the inner wall of each cylinder 15 terminates short of the flange 16 to provide an opening 18 to the chamber 17 of the cylinder 15, as clearly shown in Figure 7 of the drawings. The inner facing walls of the cylinders 15 define a plunger chamber 25, of polygonal cross section, according to the number and arrangement of cylinders. In the instance shown, the plunger chamber 25 is of rather hexagonal-shape, as shown in Figure 8 of the drawings.

A plunger detent mechanism is provided for the cartridge clip consisting of a plunger shaft or rod 30 reciprocably supported upon a detachable cover 31 which is attached as by means of screws 32 to the flange 16 for the purpose of closing the rear end of the clip. This plunger shaft 30 extends axially into the plunger chamber 25 formed in a central cylindrical portion of the casing and is provided with a plunger guide 40 which conforms to the cross sectional configuration of the plunger passageway 25. That is, it has the same cross sectional characteristics so as to prevent turning of the plunger mechanism.

The plunger shaft 30 also supports a flexible detent member 50 of rubber. The guide 40 and the detent member 50 are spaced by means of a washer 51 and there retained in this position upon the screw threaded plunger shaft 30 by means of nuts 52 and 53, as shown in Figure 7 of the drawings. If desired, the plunger shaft 30 may also support a cylindrical band 55 to limit the extent of protrusion of the plunger mechanism and to facilitate the loading of the cartridges in cooperative association with the detent mechanism 50 to be subsequently described.

The flexible detent member 50 is preferably made of rubber or other similar resilient and flexible material which will naturally spring into the cartridge detent position shown in Figure 7.

It comprises a body portion clamped in the position above mentioned with lateral detent extensions 60 for each cartridge cell chamber 7, and which projects laterally into said chamber 17 in the relation shown in Figure 8 of the drawings. These extensions 60 are preferably provided with straight edges which are adapted to contact with the cartridges beneath the rim or flange of the cartridges so as to hold the cartridges in the position shown in Figure 17. It is noted that the detent extensions 60 project thru the openings 18 into the cell chambers 17. It will be noted that there is nothing hard nor abrasive which will mar the cartridge casing, or cause it to prematurely explode. That is very important when it is considered that so far as mutilation of the cartridge casing is concerned, it could in some instances jam in the barrel of the firearm as a result of disfiguration caused by a metallic detent.

It is to be noted that the limiting band 55 determines the protrusion of the plunger mechanism and in this position the detent extensions 60 will support the cartridges spaced slightly from the wall or flange 16.

The end of the plunger passageway 25 is provided with a centering and protecting plug 80, preferably of wood or some material such as plastic, which is softer than the centering pin of the gun barrel. This plug 80 is socketed as at 81 for cooperation in a centering relation with the hub or pin ordinarily found upon revolvers or like firearms. This arrangement permits of the instant centering of the cartridges with respect to the barrel chambers.

A compression spring 83 is disposed in the plunger passageway 25 between the plug 80 and the nut 53 for the purpose of normally urging the plunger outwardly to the position shown in Figure 7 where the detent member 50 has its extensions 60 in a restraining relation with the cartridges.

It will be noted that the guide 40 prevents turning of the plunger mechanism, as above mentioned, and the nut 52 is of such size as to permit the detent extensions 60 to be retracted from the openings 18 and from the cartridge cell chamber 17 when the plunger is depressed; these extensions 60 then being depressed in cup-shaped relation within the plunger passageway 25 as shown in Figure 11 of the drawings. This will permit ejection of the cartridge into the gun barrel chamber.

Referring to the holder D, the same is adapted to be belt supported, and is arranged so as to facilitate the prompt removal of the cartridge clip from the holder such as would be required under rapid fire conditions. To that end the holder D comprises a cylindrical-shaped casing 90 having an integral end wall 91 which slopes downwardly from the belt supporting side of the casing 90 for the purpose of preventing the collection of moisture and other debris. The lower end of the casing 90 is open and there provided with a trap door 92 hinged as at 93 so as to lie partially within the chamber 94 of the casing 90 a distance sufficient to also permit the bolt mechanism of the trap door lying within the chamber entrance of the casing at the lower end thereof below the trap door. This is a feature of protection which can be varied if desired. This bolt mechanism comprises a barrel portion 99 integrally provided diametrically upon the lower surface of the trap door 92 and extending from the point of belt connection of the casing transverse or normal to the plane of the belt. It receives a bolt 100 slidable therein. This bolt 100 has an extension 101 adapted to seat in a narrow recess 102 in the bolt barrel 99 to lock the bolt in its keeper opening 103 in the casing 90 for the purpose of maintaining the trap door closed against accidental opening. The barrel 99 is also laterally slotted as shown at 110 in Figure 4 of the drawings, and which slot 110 communicates with the slot 102. It is longer than the slot 102 and accommodates the extension 101 in the position shown in Figure 4 so that the bolt can be retracted for the purpose of permitting the trap door to swing downwardly and release the cartridge clip, in the relation shown in Figure 4. This arrangement obviously prevents accidental retraction of the bolt and consequently prevents accidental opening of the trap door.

The casing 90 is provided with a loop or strap 115 adapted to threadably receive the belt, as shown in Figure 2 of the drawings, for the purpose of supporting the casing 90 in the position shown. The loop or strap 115 is sufficiently broad to prevent lateral rocking of the casing 90 upon the belt. As additional means for the orderly support of the holders D upon the belt, I prefer to provide a socket extension 120 at one side of the casing 90 and diametrically opposed thereto a male extension 121. The extension 121 of one cartridge clip holder D will interfit in the socket extension 120 of the adjacent holder D, so that the holders D will be supported in a definitely spaced non-turning and assembled position upon the belt E.

It is intended that the cartridge clip A will be assembled with the cartridge pointing downwardly and with the plunger mechanism of the cartridge clip pointing upwardly, so that when the trap door is released the cartridge clip with the lead heads of the cartridges will drop downwardly into the hand of the operator. In order to prevent premature operation of the plunger mechanism within the holder D, such as would be likely to occur by contact of the holder against the top wall 91 of the holder casing, I provide an inverted cup-shaped member 130 which has a socket or recess 131 therein facing downwardly to receive the projecting end of the plunger head, when the plunger is extended to its maximum position; the plunger and its operating head resting freely in the socket passageway 131, as shown in Figure 2, so that it can not be prematurely operated. The cup 130 is preferably detachably supported by a screw 132.

The compactness and simplicity of the cartridge and its associated holder will be apparent from the foregoing description. The clip in its association within the holder, and in its cartridge releasing association with the revolver is foolproof. The holder is of such nature that it will not collect water nor debris of any sort and will always maintain the clip in position for instant operation.

Various changes in the shape, size and arrangement of parts may be made to the form of invention herein shown and described, without departing from the spirit of the invention or the scope of the following claims.

I claim:

1. In a firearm loading clip, the combination of a casing having a plurality of cartridge receiving chambers therein, a member carried by the casing and engageable with the firearm when the clip is moved into loading position with respect to the firearm for the purpose of steadying the clip, said member being formed of non-metallic material so as to prevent injury to the firearm part which it engages, and releasable detent means normally holding said cartridges in the chambers of said casing.

2. In a loading clip for cartridges, the combination of a casing having a plurality of cartridge receiving compartments therein arranged in annular relation, said chambers at their inner ends being intercommunicated, a plunger mechanism reciprocably supported by said casing, and a detent member carried by said plunger means having detent extensions normally projecting into the chambers of said casing for cartridge restraining purposes, said detent member being formed of flexible non-metallic material so as to be retractable from its normal cartridge restraining position and to prevent injury to the cartridge.

3. In a firearm reloading clip the combination of a casing having a plurality of cartridge receiving compartments therein, a plunger slidably carried by the casing manually operable from the end of the casing opposite the cartridge ejection end, and a yieldable non-metallic cartridge restraining member carried by the plunger, said casing being formed to retract the cartridge restraining member from cartridge restraining position as the plunger is manually moved into cartridge ejection position, said cartridge restraining member being formed of non-metallic material of such nature as to present injury to the cartridges it engages.

4. In a loading cartridge clip for firearms the combination of a supporting casing having an annular arrangement of cartridge receiving compartments therein open at an end of the casing to permit ejection therefrom, a positioning member at the cartridge ejection end of the casing of non-metallic material for engaging a part of the firearm and of such nature as to prevent injury thereto as the member engages the firearm for centering the clip for reloading purposes, a plunger reciprocably carried by the casing, means for operating the plunger from the end of the casing opposite said firearm engaging member, and detent means operable by the plunger, said detent means being constructed and arranged so as to engage cartridges for holding the cartridges in the casing in assembled relation and upon movement thereof from normal position to release the cartridges.

5. In a firearm reloading clip the combination of a casing having a central cylinder and a surrounding annular arrangement of cartridge receiving compartments, a plunger reciprocably mounted in the central cylinder having a detent thereon of non-metallic flexible material provided with portions constructed and arranged to extend normally into the cartridge chambers for restraining the cartridges therein, spring means normally moving the plunger to position the detent in cartridge holding position, and means connected with the plunger operable upon the casing at the end thereof opposite the cartridge ejecting end for moving the plunger and retracting the detent from cartridge restraining position.

WILLIAM W. BAUCUM.